June 12, 1928.
B. D. BUSHELL ET AL
1,673,226
METHOD OF ELECTRIC HEATING
Filed Aug. 7, 1926
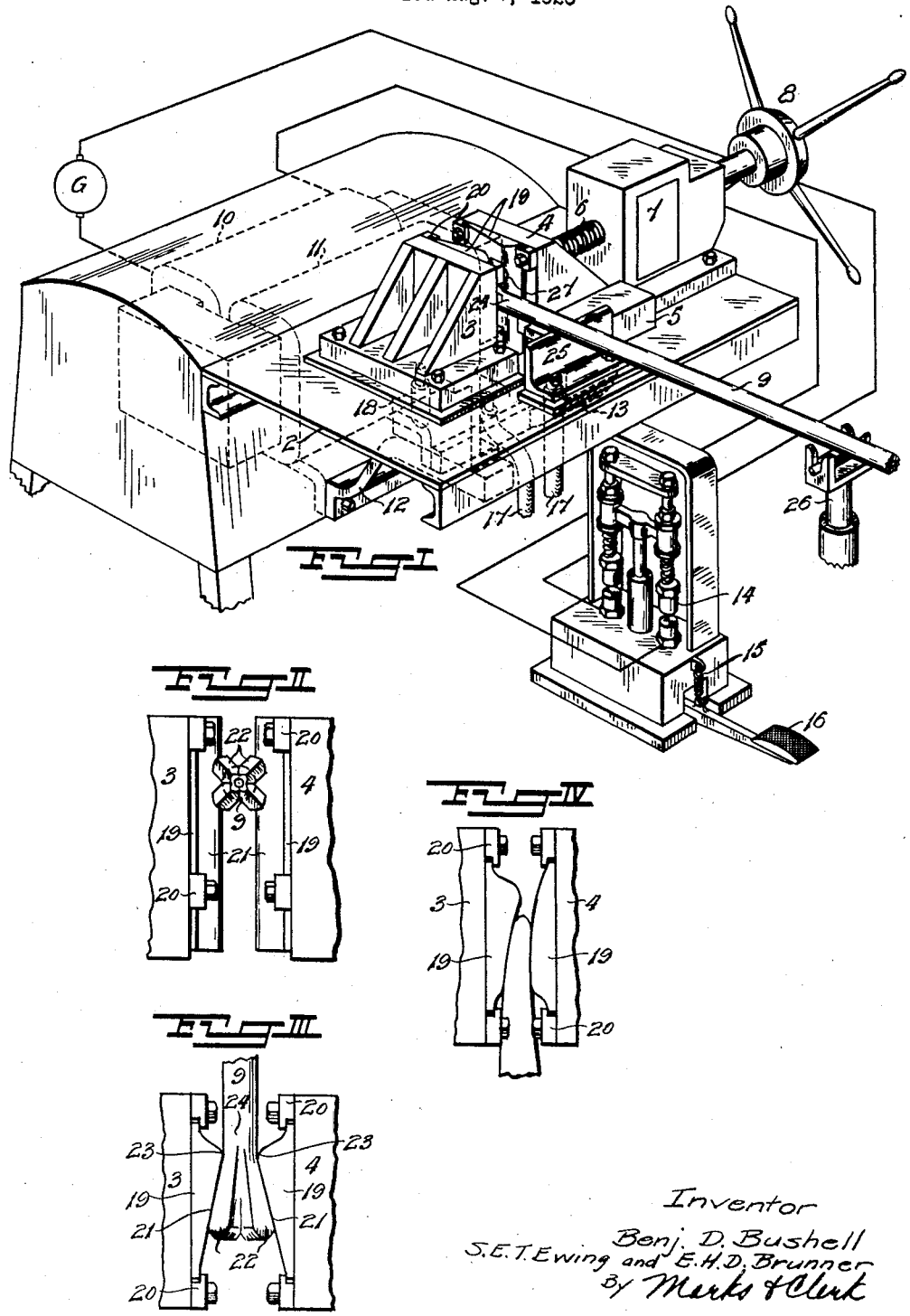
Inventor
Benj. D. Bushell
S. E. T. Ewing and E. H. D. Brunner
By Marks & Clerk
Attys.

Patented June 12, 1928.

1,673,226

UNITED STATES PATENT OFFICE.

BENJAMIN DANIEL BUSHELL, OF SPRINGS, SYDNEY EDWARD THACKER EWING, OF JOHANNESBURG, AND ERNEST HENRY DOMINICUS BRUNNER, OF SPRINGS, TRANSVAAL, SOUTH AFRICA.

METHOD OF ELECTRIC HEATING.

Application filed August 7, 1926, Serial No. 127,947, and in the Union of South Africa May 6, 1926.

The operations of mining, tunneling and the like necessitate the use of large numbers of steel tools, such as rock drill tools, coal-cutter tools, picks and the like having hardened cutting or striking ends. As these become blunted they have to be re-sharpened by forging and re-hardened after forging. It is not feasible to heat the tools for these purposes in the enclosed space of a mine or tunnel by means of the usual fuel-burning furnaces since the latter vitiate the air and give off large quantities of wasted heat; and it is accordingly the practice to convey the blunted tools to the surface and to return them underground after they have been sharpened and hardened. This involves considerable expense for transportation and also unprofitable outlay for a much greater number of tools than are at any time in use.

The present invention provides an electrical method and apparatus for heating such tools which produce heat only in the limited portion of the tool which requires to be heated, thus minimizing heating of the atmosphere. Since also the apparatus gives off no injurious fumes, it can be used underground for forging and hardening tools near to their place of use, thus enabling the expense of transportation of tools to be materially reduced and a considerable saving to be made in the cost of the tool equipment.

Apparatus according to the invention is illustrated in the accompanying drawing in which Fig. I is a general perspective view, Fig. II is a view, to a different scale, showing the end of a drill tool positioned for heating, Fig. III is a plan of Fig. II, Fig. IV shows modified jaws.

2 indicates a bench on which are mounted electrode clamps 3, 4. The clamp 3 is fixed to, but insulated from the bench. The clamp 4 is mounted on a guide 5 to slide towards and from the clamp 3, being traversed by such means as the feed screw 6 which engages the renewable nut 7 and is actuated by the capstan wheel 8. The latter is conveniently positioned for actuation by one hand of the operator while his other hand is employed with the tool 9 which is to be heated.

10, 11 indicate an adjustable transformer, the low-voltage winding 11 of which is connected to the electrode clamps 3, 4, by leads 12, 13 respectively, the lead 13 being flexible to allow the necessary movement of clamp 4.

An important feature of the apparatus is the means enabling the operator to switch the current on and off rapidly and frequently without interference with the necessary manipulation of the work and the machine. Accordingly there is provided in the high-voltage circuit a switch 14 opened by a spring 15 and closed by a pedal 16 conveniently positioned for actuation by the operator when he is standing in the position to hold the work with one hand and to operate the capstan wheel 8 with the other hand.

The electrode clamps 3, 4, are hollow and are cooled by water circulated through them by pipes 17, 18.

The opposing faces of the electrode clamps are provided with detachable jaws 19. The contacting faces of the jaws and clamps are machined to make good electrical contact and are secured in close mechanical contact by the clips 20.

The body to be heated is clamped at its sides between the inner faces of the jaws 19; and said inner faces are shaped to the general form or profile of the body so as to make reasonably good electrical contact therewith. The drawings illustrate the heating, for forging, of the flared cutting end of a cruciform percussive rock drill tool 9. The jaw faces for this purpose comprise plane areas 21 sloped to one another correspondingly with the profile of the drill wings 22 and curved shoulders 23 fitting the neck 24 of the drill.

The tool is supported in a horizontal position and perpendicularly to the direction of movement of the jaws by an insulated rest 25 near to the clamps and a portable rest 26 positioned at a suitable distance from the bench according to the length of the drill.

In operation it is desirable to pickle the end of the drill in order to remove from its surface non-conducting material such as scale. The pickled drill is placed on the rests 25, 26 in the proper position for its flared end 22 to be engaged by the sloped surfaces 21 of the clamp jaws; and the capstan wheel 8 is actuated to cause the end to be gripped laterally between the jaws as indicated in Figs. II and III.

The pedal 16 is then depressed, causing low-voltage current to flow between the electrodes and transversely through the drill end. A heavy current of say 17,000 amperes is employed, resulting in rapid heating of the drill end.

Owing to the irregular cross sectional form of the drill end, heating takes place most rapidly at localized points, for example, at the neck 24 and at the edges of the wings 22. As soon as this uneven heating becomes pronounced the current is switched off by releasing the pedal 16; whereupon heat quickly flows from the more highly heated to the less heated zones of the end. After a short interval current is again switched on and once more switched off when the irregular heating again becomes pronounced; this being repeated several times until the whole end is heated substantially uniformly to the desired temperature. The pedal 16 is thereupon finally released, the capstan wheel 8 is operated to retract the clamp 4, and the drill is removed.

With the controls conveniently arranged as shown so that while holding the drill in one hand, the operator can turn the wheel 8 with his other hand and operate the pedal 16 with his foot; using an appropriate heavy current; and switching on and off three or four times in each heat, one man can readily heat numbers of drill ends to forging temperature at the rate of about four per minute.

As the jaws 19 become worn and out of shape by repeated closing onto the drill, they may be adjusted to bring fresh parts of their surfaces into use by loosening the clips 20 and adjusting the jaws vertically. Fig. I shows a worn part 27 thus raised out of clamping position.

For different classes of work other jaws differing in the form of their inner surfaces are employed. Those illustrated being intended for heating a drill end for forging, are shaped as previously described to engage the entire flared end of the drill from the tip to the neck. For hardening the forged drills, jaws shorter in the direction of the axis of the drill may be used or the drill may be drawn back, with the object in both cases of confining the heating current more to the point of the drill. For other tools, jaws of appropriate shape are used; Fig. IV illustrating jaws for heating the tips of a pick head.

It will be seen that by reason of the electrode clamps engaging the opposite sides of the body, the apparatus is adapted for localized heating of portions of bodies having a general rod-like character, whether such portions are ends or intermediate portions; and that by reason of the clamp jaws being conformed to the outline of the article and the ability to readily make the current flow intermittently as desired, sections of irregular form can successfully and rapidly be brought to a substantially uniform temperature.

We claim—

1. The method of heating a conducting body which is of generally elongated form and which varies in cross section at different parts of its length, the said method consisting in passing heating electric current transversely across a plurality of different cross sections of said body and repeatedly interrupting the heating current at such intervals and for such periods as on the one hand to avoid overheating of the cross sections more readily heated by the heating currents and on the other hand to allow heat to be conducted from such cross sections to cross sections which the current tends to heat less rapidly, and thereby promote the uniform heating of the body.

2. The method of heating the flared end of a percussive rock drilling tool according to claim 1, in which the heating current is passed transversely across said end at substantially all its cross sections, and in which the current is so interrupted that the free extremity of said end becomes heated to a temperature not less than the remainder of said end.

In testimony whereof we affix our signatures.

BENJAMIN DANIEL BUSHELL.
SYDNEY EDWARD THACKER EWING.
ERNEST HENRY DOMINICUS BRUNNER.